US012587589B2

(12) United States Patent
Hubbs

(10) Patent No.: US 12,587,589 B2
(45) Date of Patent: Mar. 24, 2026

(54) METHOD FOR USING STATELESS SOFTWARE DATABASE DATA TO PERFORM DATA AND CONTROL COUPLING

(71) Applicant: Rockwell Collins, Inc., Cedar Rapids, IA (US)

(72) Inventor: Christopher J. Hubbs, Hiawatha, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 689 days.

(21) Appl. No.: 18/107,731

(22) Filed: Feb. 9, 2023

(65) Prior Publication Data

US 2024/0275852 A1     Aug. 15, 2024

(51) Int. Cl.
*H04L 67/142*       (2022.01)
*G06F 9/50*        (2006.01)
*G06F 11/3604*      (2025.01)

(52) U.S. Cl.
CPC .......... *H04L 67/142* (2013.01); *G06F 9/5055* (2013.01); *G06F 11/3604* (2013.01); *G06F 2209/501* (2013.01)

(58) Field of Classification Search
CPC .. H04L 67/142; G06F 9/5055; G06F 11/3604; G06F 2209/501
USPC ........................................................ 709/201
See application file for complete search history.

(56) References Cited

U.S. PATENT DOCUMENTS 8,893,087 B2    11/2014  Maddela
9,268,672 B1     2/2016  Gupta

| | | | |
|---|---|---|---|
| 11,474,927 B1 * | 10/2022 | Hennell | .................... G06F 8/75 |
| 2005/0204201 A1 | 9/2005 | Meenakshisundaram et al. | |
| 2013/0205172 A1 | 8/2013 | Hudgons et al. | |
| 2019/0073292 A1 * | 3/2019 | Kuppusamy | ........ G06F 11/3672 |
| 2020/0379891 A1 | 12/2020 | Canter | |
| 2021/0240600 A1 * | 8/2021 | Larosa | ................ G06F 11/3698 |
| 2022/0083333 A1 | 3/2022 | Cullum | |

FOREIGN PATENT DOCUMENTS

| | | |
|---|---|---|
| CN | 110096437 A | 8/2019 |
| EP | 1236104 B1 | 1/2012 |

OTHER PUBLICATIONS

Extended European Search Report dated May 6, 2024; European Application No. 23209809.5.

* cited by examiner

*Primary Examiner* — Hermon Asres
(74) *Attorney, Agent, or Firm* — Suiter Swantz IP

(57)            ABSTRACT

A system for evaluating stateless software using read and write operations to storage is disclosed. The system may include a controller, which may include one or more processors configured to execute program instructions stored on a memory. The one or more processors may be configured to evaluate the stateless software, including modules of the stateless software. The stateless software may be configured to store data on a storage such that each request to the stateless software does not rely on a state of the stateless software from a previous request. The evaluating of the stateless software may include executing the stateless software based on a set of requests, recording a log of read operations and write operations to the storage during the executing of the stateless software, and determining a performance of the stateless software based on a parsing and evaluation of the read and write operations.

14 Claims, 8 Drawing Sheets

```
class ExampleFunction:
    def init(self,name,message):
        self.name = name
        self.msg = message def print_message_n_times(self,m,n):
        print("Hello, name name is %s" % self.name)
        print("The message built-in is %s" % self.msg)
        for i in range(n):
            print("The message you passed to me is %s" % m)
        return 1
```

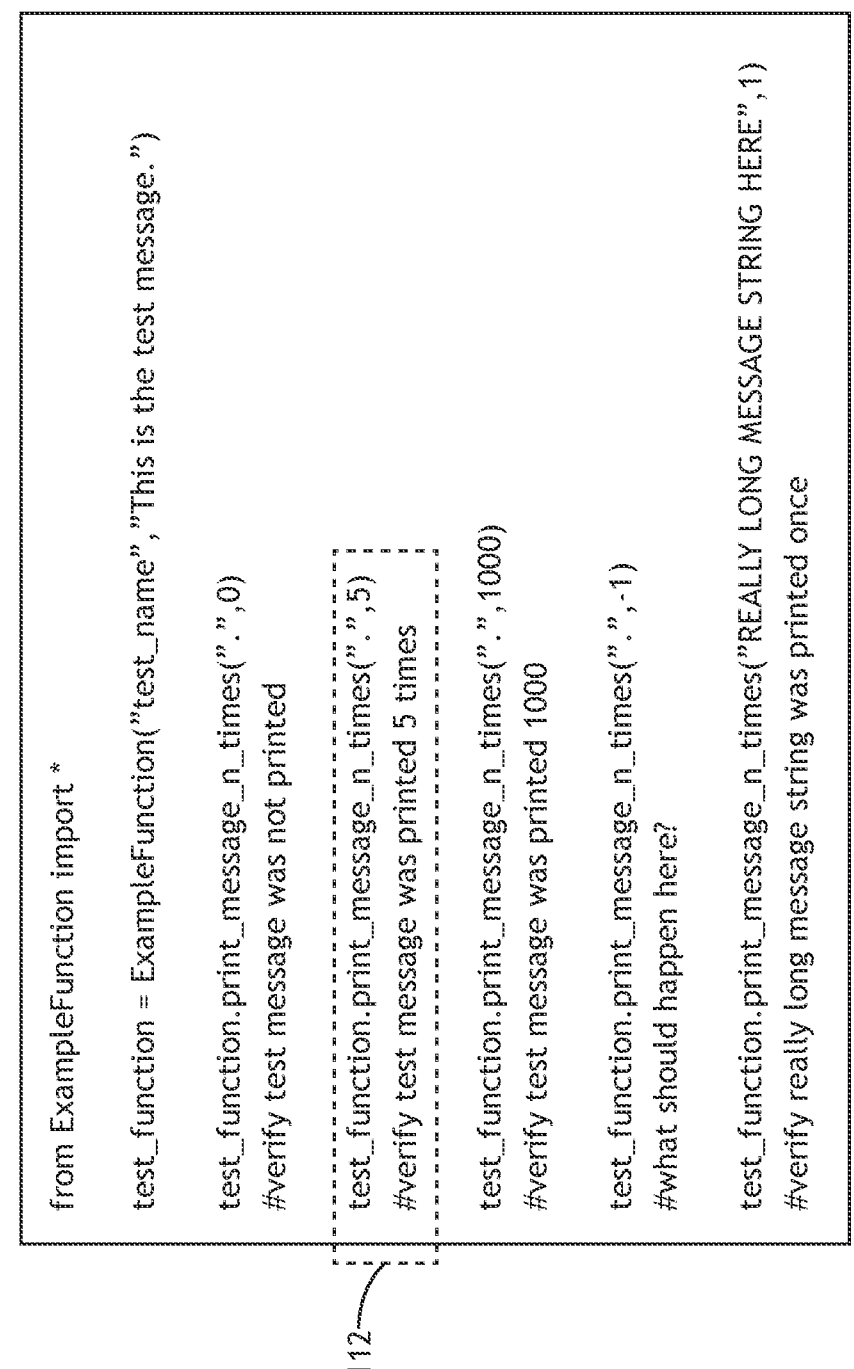

```
from ExampleFunction import * test_function = ExampleFunction("test_name", "This is the test message.")

test_function.print_message_n_times(".", 0)
verify test message was not printed test_function.print_message_n_times(".", 5)
verify test message was printed 5 times test_function.print_message_n_times(".", 1000)
verify test message was printed 1000 test_function.print_message_n_times(".", -1)
what should happen here?

test_function.print_message_n_times("REALLY LONG MESSAGE STRING HERE", 1)
#verify really long message string was printed once
```

```
send_inputs_to_integrated_sw("Real message contents", typical_repetition)
verify real message is displayed the correct number of times send_inputs_to_integrated_sw("Another real message contents", typical_repetition)
verify another real message is displayed the correct number of times
```

```
def print_message_n_times(self):
    print("Hello, name name is %s" % self.name)
    print("The message built-in is %s" % self.msg)
    input_message_repetition = database.read(input_repetition)
    input_message_contents = database.read(input_message)
    for i in range(input_message_repetition):
        print("The message you passed to me is %s" % input_message_contents)
    return 1
```

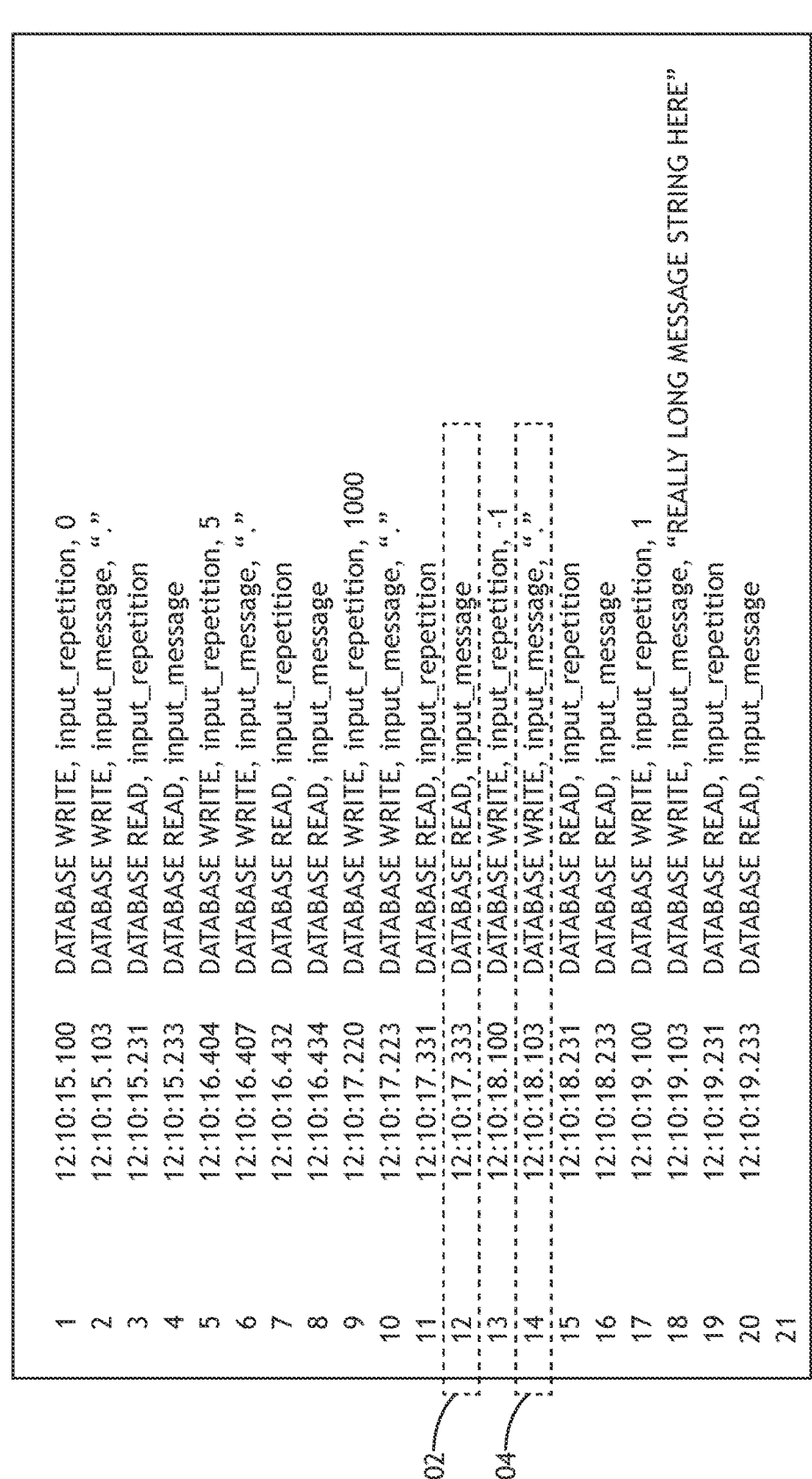

| 1 | 12:10:15.100 | DATABASE WRITE, input_repetition, 0 |
| 2 | 12:10:15.103 | DATABASE WRITE, input_message, " " |
| 3 | 12:10:15.231 | DATABASE READ, input_repetition |
| 4 | 12:10:15.233 | DATABASE READ, input_message |
| 5 | 12:10:16.404 | DATABASE WRITE, input_repetition, 5 |
| 6 | 12:10:16.407 | DATABASE WRITE, input_message, " " |
| 7 | 12:10:16.432 | DATABASE READ, input_repetition |
| 8 | 12:10:16.434 | DATABASE READ, input_message |
| 9 | 12:10:17.220 | DATABASE WRITE, input_repetition, 1000 |
| 10 | 12:10:17.223 | DATABASE WRITE, input_message, " " |
| 11 | 12:10:17.331 | DATABASE READ, input_repetition |
| 12 | 12:10:17.333 | DATABASE READ, input_message |
| 13 | 12:10:18.100 | DATABASE WRITE, input_repetition, -1 |
| 14 | 12:10:18.103 | DATABASE WRITE, input_message, " " |
| 15 | 12:10:18.231 | DATABASE READ, input_repetition |
| 16 | 12:10:18.233 | DATABASE READ, input_message |
| 17 | 12:10:19.100 | DATABASE WRITE, input_repetition, 1 |
| 18 | 12:10:19.103 | DATABASE WRITE, input_message, "REALLY LONG MESSAGE STRING HERE" |
| 19 | 12:10:19.231 | DATABASE READ, input_repetition |
| 20 | 12:10:19.233 | DATABASE READ, input_message |
| 21 | | |

METHOD FOR USING STATELESS SOFTWARE DATABASE DATA TO PERFORM DATA AND CONTROL COUPLING

TECHNICAL FIELD

The present disclosure relates generally to evaluating proper software functionality, and, more particularly, to evaluating proper control coupling between integrated stateless software modules.

BACKGROUND

A stateless software application is an application that is configured to store data in storage such that each request sent to the stateless software is treated independently and does not rely on a state of the stateless software from a previous request. Stateless software does not remember or retain data used or generated from a previous request. For example, user data is not stored in the stateless software, but may be sent to a database (e.g., external distributed database, virtualized database of a hyperconverged system, and the like). In this regard, the stateless software does not change state between requests. By way of another example, coupling interfaces between modules are also stateless. In stateless software, coupling interfaces are generally formed indirectly by first writing data (e.g., values of variables) to the database from one module, which is then read from the database by another module.

Data and control coupling analysis ensures that software modules verified at the unit level are integrated successfully and that their interfaces demonstrate proper function. For example, analysis may be performed for interfaces related to execution, interfaces for passing data between modules, and the like. Data and control coupling analysis is a challenging aspect of software development required to meet industry standards. An example of an industry standard is DO-178C, an international standard that provides recommendations for the production of airborne systems and equipment software.

Prior methodologies perform data and control coupling analysis of integrated stateless software via manual review of test cases to determine whether interfaces were properly exercised along a pathway (e.g., specific sequence of when each module is called during an execution of the software based on the specific request sent to the software). Engineers may perform an analysis of the test cases to determine whether the integrated testing sufficiently proves that the software is functioning properly. This is often time-consuming and error-prone. Moreover, this analysis is usually somewhat qualitative and often drives teams towards excessive integrated verification. As the number of modules and complexity of integration increases, writing an adequate number of test cases to properly evaluate the pathways may become impractical, inefficient, and/or relatively expensive.

Therefore, there is a need for a system and method that can evaluate integrated stateless software while minimizing or eliminating one or more of these challenges.

SUMMARY

A system for evaluating stateless software using read and write operations to a storage is disclosed in accordance with one or more illustrative embodiments of the present disclosure. In one illustrative embodiment, the system may include a controller. In another illustrative embodiment, the controller may include one or more processors configured to execute program instructions stored on a memory. In another illustrative embodiment, the one or more processors may be configured to evaluate the stateless software, including modules of the stateless software. In another illustrative embodiment, the stateless software may be configured to store data on a storage such that each request to the stateless software does not rely on a state of the stateless software from a previous request. In another illustrative embodiment, the evaluating of the stateless software may include executing the stateless software based on a set of requests, recording a log of read operations and write operations to the storage during the executing of the stateless software, and determining a performance of the stateless software based on a parsing and evaluation of the read operations and the write operations. In another illustrative embodiment, the determining of the performance may include verifying a proper control coupling between the modules based on the read operations and the write operations.

A method for evaluating stateless software is disclosed in accordance with one or more illustrative embodiments of the present disclosure. In one illustrative embodiment, the method may include evaluating the stateless software, including modules of the stateless software. In another illustrative embodiment, the stateless software may be configured to store data on a storage such that each request to the stateless software does not rely on a state of the stateless software from a previous request. In another illustrative embodiment, the evaluating of the stateless software may include executing the stateless software based on a set of requests, recording a log of read operations and write operations to the storage during the executing of the stateless software, and determining a performance of the stateless software based on a parsing and evaluation of the read operations and the write operations.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 1B is a view of a non-stateless module unit test request.

FIG. 1C is a view of a non-stateless module runtime request.

FIG. 4 is a log including read operations and write operations, in accordance with one or more embodiments of the present disclosure.

DETAILED DESCRIPTION

Figure 1A:
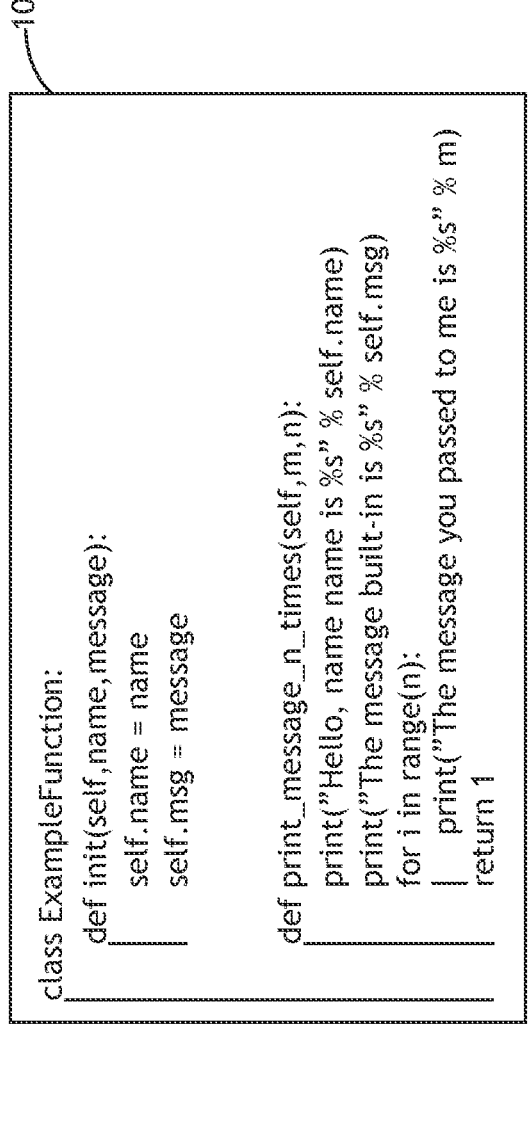
FIG. 1A is a view of a non-stateless module.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, embodiments of the inventive concepts disclosed herein are directed to a system and method for efficient evaluation of stateless software by recording the read and write operations of the storage (e.g., external storage) on a log, and using the log itself to evaluate the proper exercising of interfaces between modules of the stateless software. In one or more embodiments, a set of requests may be sent to the stateless software and a log generated of all read/write operations performed. The log may be parsed to search for one or more sets of read and/or write operations expected for one or more interfaces. In this regard—rather than creating test cases that are painstakingly added to the code to print a set of test/debug values used in evaluation of the interfaces/pathways—the software may, in some embodiments, be run essentially as-is, and then the log parsed.

Consider a scenario of an e-commerce website that is stateless and which includes multiple modules such as an inventory module, a shopping cart module, and a payment module. Such modules depend on each other. For example, the shopping cart module may be configured to check for adequate inventory based on inventory quantities maintained by the inventory module. Manual test cases may be created to test the integrated modules. For example, a purchase test case that requests a purchase be performed and that prints out the inventory quantity to see if that inventory quantity is adjusted properly. However, setting up the code to print out such values and perform the test and evaluate it may be slow and inefficient.

Stateless software databases provide non-invasive ability to record and review data passed across module boundaries. This enables automation of the analysis and the potential for qualifying a tool to do the analysis, greatly reducing the cost to analyze.

Embodiments of the present disclosure are generally more efficient than other methodologies, such as writing test cases. As the number of interfaces/pathways between modules increases, the number of test cases needed to test each possible pathway also increases. Some pathways may need to use module interfaces common to other pathways, which may require writing redundant code that performs redundant testing of these common interfaces. The amount of redundancy generally increases exponentially as the number of pathways increases because pathways may overlap each other. As the number of manually written test cases increases, so does the likelihood of mistakes. In this regard, as noted earlier, writing test cases for integrated software may be error-prone and time-consuming.

At least some embodiments of the present disclosure, on the other hand, do not necessarily require such redundancies. For example, additional interfaces of a newly added module may be tested relatively quickly, in embodiments, by repeating a set of requests used previously. For instance, if the newly added module is interfaced with another module, and the set of requests is configured to call the other module, then using the same set of requests may generate a new log that includes reads and/or writes associated with the newly added module. These new reads/writes may be quickly searched for and identified as verifying a proper call of the newly added module. In this regard, testing interfaces to newly added modules may be relatively efficient and less error prone compared to writing a set of new test cases or modifying all existing test cases to be compatible with the newly added modules.

For the purpose of the present disclosure, a "module" includes, but is not necessarily limited to, program instructions or a sub-set of program instructions configured to be executed on a processor. For example, a module may be a function or set of functions defined in a programming language and configured to receive an input, generate an output, and/or perform some task.

FIG. 1A illustrates a view 100 of a non-stateless module 102. Note how the inputs (e.g., 'm', 'n') are passed to the module via a function call, rather than from a database. For example, in Python coding language, variables (e.g., "m") may be defined (e.g., "def function(self, m)") such that during a function call, values of that variable may be passed to the module. This may differ from stateless software where, at least generally, variable values are passed to a module by having the module look up such values in a database. For instance, see an example stateless module 202 being defined in FIG. 2A.

FIG. 1B illustrates a view 110 of a non-stateless module unit test request 112. Such tests may be manually written and designed to test for a variety of failures of the modules (e.g., stateless modules 202 and/or non-stateless modules).

FIG. 1C illustrates a view 120 of a non-stateless module runtime request 122. FIG. 1C may illustrate an example test of an integrated software (i.e., where multiple modules are integrated together). Typically, in conventional methods that are not necessarily used in the present disclosure, fewer test requests are sent using such conventional integrated testing. This may, in part, be due to the effort required to set up such tests. However, in embodiments of the present disclosure, it is contemplated that more tests and requests may be sent/executed with relatively less effort, due to efficiencies of embodiments herein.

Figure 1D:
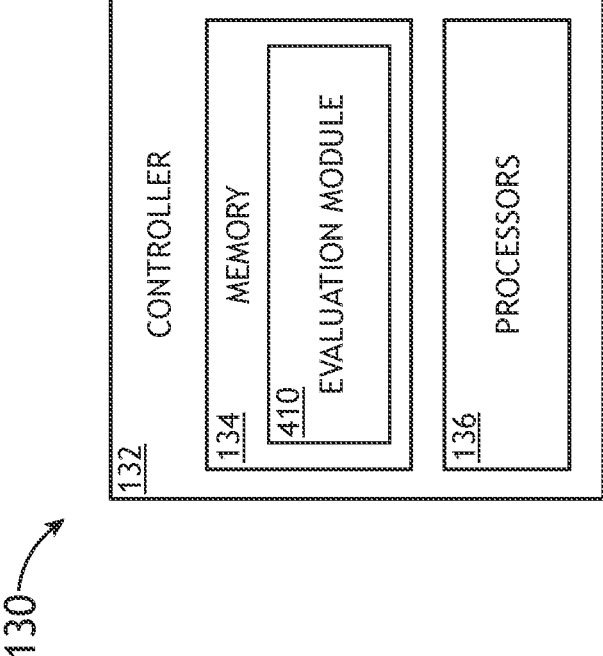
FIG. 1D is a conceptual block diagram of a system including a controller, in accordance with one or more embodiments of the present disclosure.

FIG. 1D is a conceptual block diagram of a system 130 including a controller 132, in accordance with one or more embodiments of the present disclosure. The controller 132 may be coupled to a memory 134 and a processor 136. The controller 132 may be any controller configured to perform the steps and/or methods herein and/or the like, such as, but not limited to, a desktop computer, laptop, phone, cloud server, and/or the like.

Figure 2A:
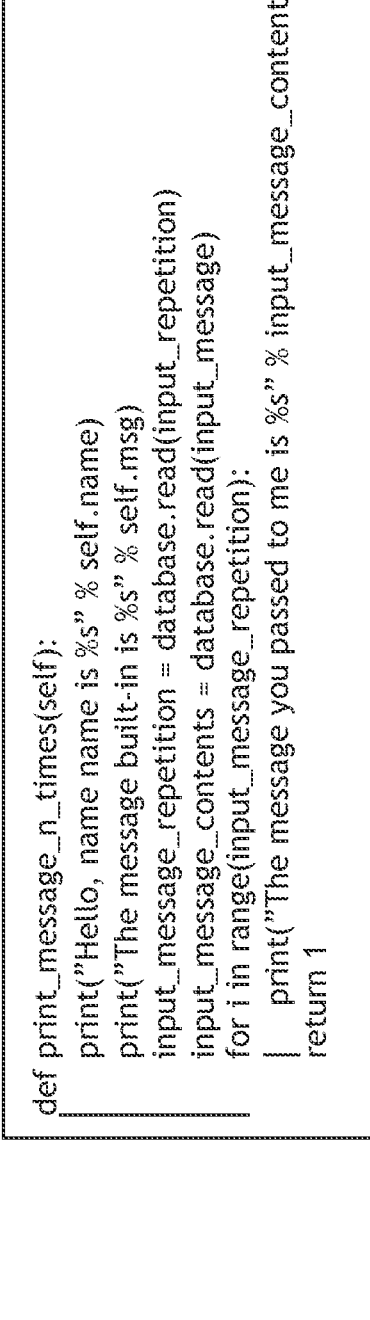
FIG. 2A is a view of a (stateless) module, in accordance with one or more embodiments of the present disclosure.
Figure 2A:

FIG. 2A illustrates a view 200 of a (stateless) module 202, in accordance with one or more embodiments of the present disclosure. Note how the inputs (e.g., 'input_repetition', 'input_message') are passed to the module from a database, rather than via a function call.

Figure 3:
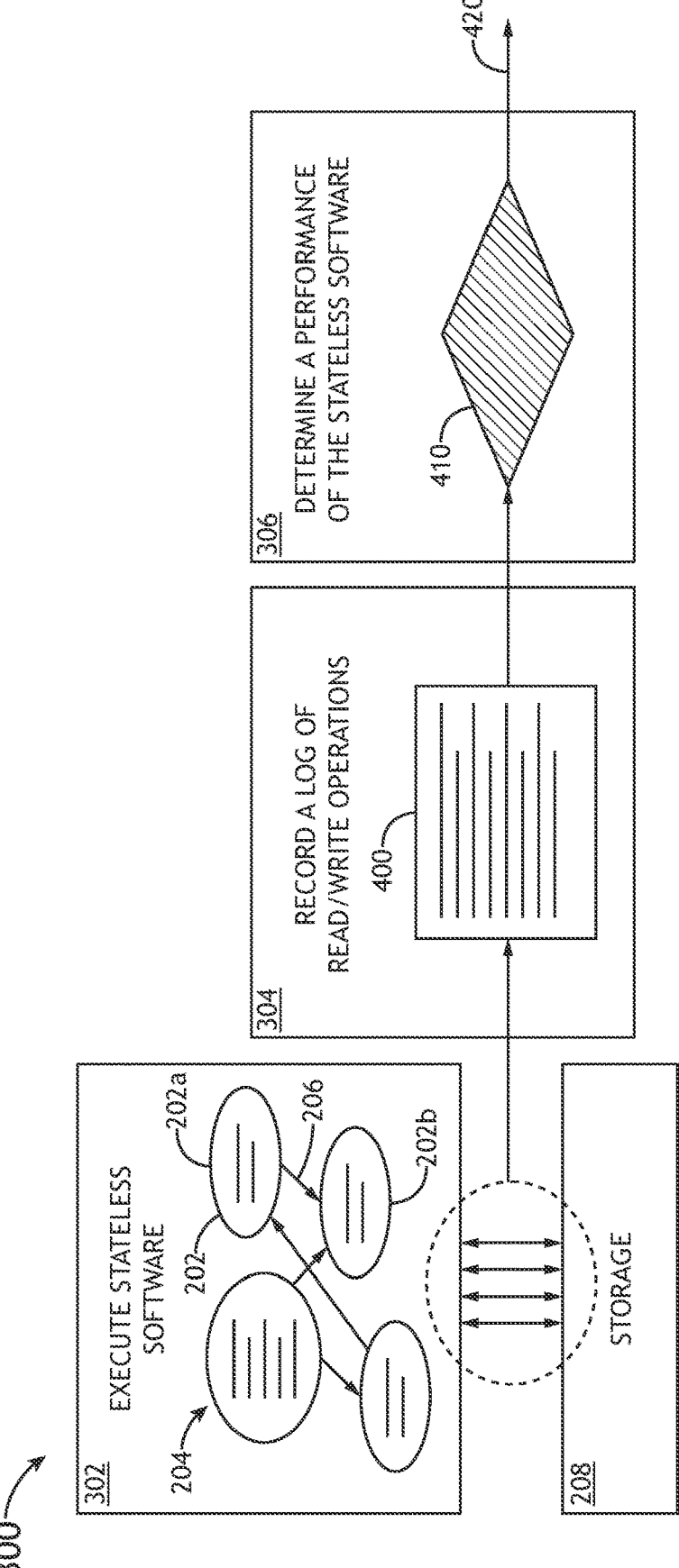
FIG. 3 is a flow diagram illustrating steps performed in a method for evaluating stateless software, in accordance with one or more embodiments of the present disclosure.

The module 202 in FIG. 2A is an example module 202 of a stateless software 204 (see FIG. 3 for an example hierarchy diagram of a stateless software 204).

Figure 2B:
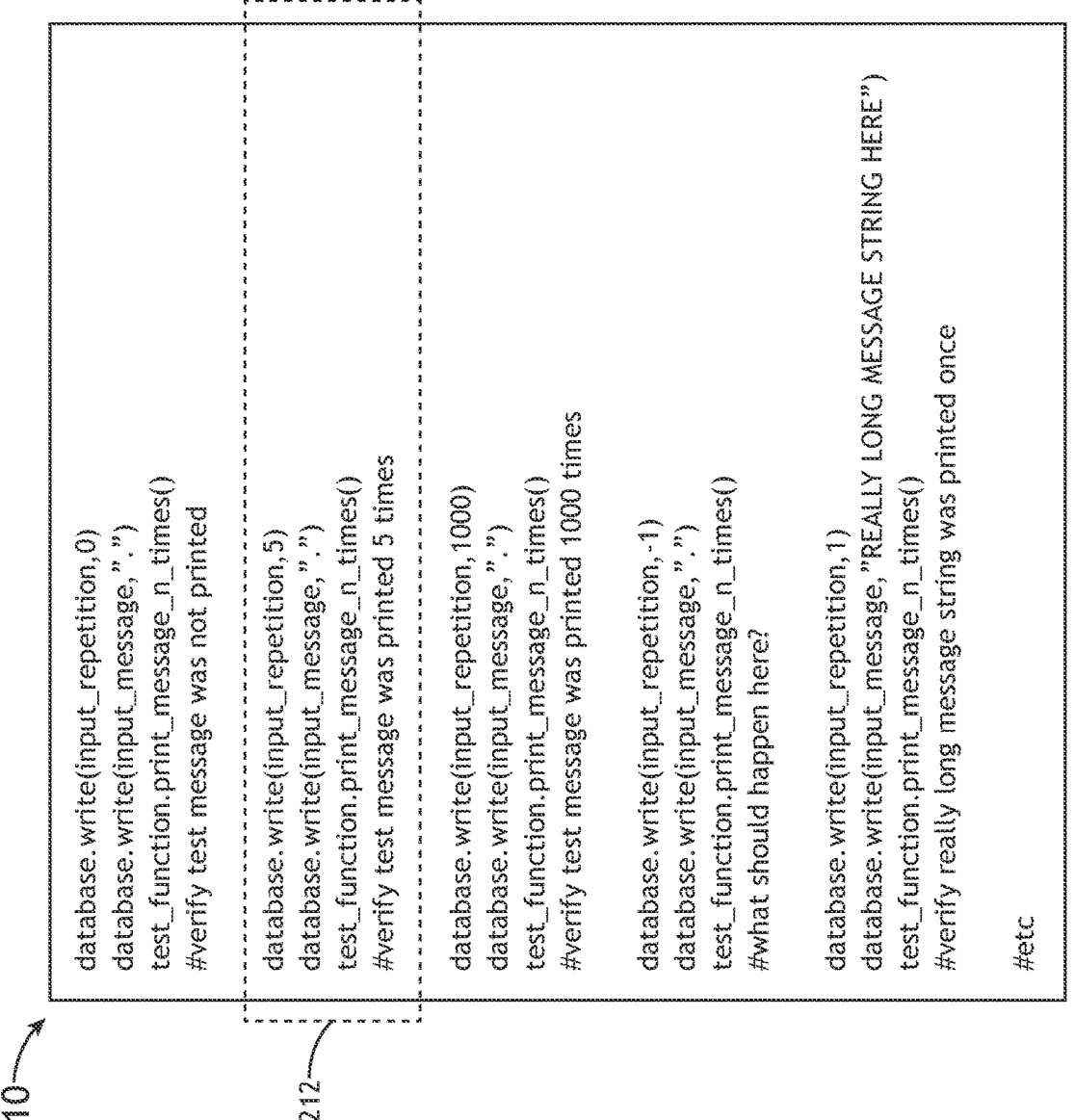
FIG. 2B is a view of a stateless module unit test request, in accordance with one or more embodiments of the present disclosure.

FIG. 2B illustrates a view 210 of a stateless module unit test request 212, in accordance with one or more embodiments of the present disclosure. The stateless module unit test request 212 may be configured to be used to evaluate a module 202 using methods known in the art for individual module unit testing. Note that a difference between FIG. 2B and FIG. 1B, is that in FIG. 2B the variable values are passed to the module 202 by first writing values to a database that the module 202 will need, and then executing the module 202. In this regard, certain variables may be associated with one or more modules 202 that utilize such variables. In embodiments, as discussed more below, a proper functioning of a module 202 may be determined from a variety of analysis of the read and write operations to the database, such as by analyzing a log of the reads/writes to the database compared to which variables are associated with which modules. In this regard, it may be determined which modules successfully executed during a test of the stateless software 204.

FIG. 3 is a flow diagram illustrating steps performed in a method 300 for evaluating stateless software 204, in accordance with one or more embodiments of the present disclosure. Method 300 is merely a nonlimiting example of performing an evaluation of a stateless software 204, and many other steps, in a variety of orders may be used. Further, the stateless software 204 shown is merely an example, and a variety of configurations of modules 202, one or more storages 208 for databases, and/or the like may be used.

In embodiments, the stateless software 204 includes two or more modules 202 that are integrated. The stateless software 204 may be configured to store data on a storage 208 (e.g., external storage, distributed storage, virtualized storage, and/or the like) such that each request to the stateless software 204 does not rely on a state of the stateless software 204 from a previous request. The modules 202 may be configured to be coupled to each other via module coupling 206. The module coupling 206 may be configured to allow the modules 202 to communicate with each other via inputs and outputs, such as by sending and receiving variable values or requests indirectly (e.g., via writing to a database and then reading from the database). The module coupling 206 and modules 202 may define a module control coupling hierarchy.

In some embodiments, the evaluation of the stateless software 204 is configured to be performed automatically via an evaluation module 410. The evaluation may be based on at least one of a module control coupling hierarchy or data types associated with the modules 202. The evaluation may include determining the module control coupling hierarchy automatically based on an analysis (and mapping) of dependencies of the modules 202 of the stateless software 204. For example, in FIG. 3, a mapping of dependencies may include mapping the module coupling 206 between the child module 202*b* and the parent module 202*a*.

For purposes of this disclosure, a nonlimiting example of a dependency is when a module 202 calls another module 202 to be executed.

Note that, for purposes of the present disclosure, language such as "pass" a variable and the like (for stateless software 204 and modules 202) includes a stateless passing of the variable such that the variable is written to storage 208, and then read by the module 202.

At step 302, the stateless software 204 may be executed (e.g., run in a virtualized environment, and the like) based on a set of requests (not shown). For example, a set of requests may be passed to the stateless software 204, one by one, in parallel, with timed delays between each request, and/or the like. For instance, the set of requests may each be a command to execute one or more modules 202 and/or to write one or more values to storage 208.

At step 304, a log 400 may be recorded of read operations 402 and write operations 404 to the storage 208 during the executing of the stateless software 204 based on the set of the requests. In embodiments, the log 400 may include an entirety of all such operations performed during the executing of the stateless software 204. In this regard, all interfaces/nodes of the stateless software 204 may be monitored. A node is generally defined as a point that receives inputs and/or generates outputs and may include modules 202. An interface is some sort of link in a communication pathway of a node such as when a module 202 reads or writes to storage 208.

At step 306, a performance 420 of the stateless software 204 may be determined based on a parsing and evaluation of the read operations 402 and/or the write operations 404 recorded on the log 400. The determining of the performance may include verifying a proper control coupling between the modules 202 based on the read operations 402 and/or the write operations 404.

In one example, the verifying of the proper control coupling may be based on the module control coupling hierarchy, a count of the read operations 402, and a count of the write operations 404. The determining of the performance 420 of the stateless software 204 may comprise verifying that a respective module 202 is properly called by the stateless software 204 based on a read operation comparison between the read operations 402 and expected read operations.

The determining of the performance of the stateless software 204 may comprise verifying a functionality of a respective module 202 based on a write operation comparison between the write operations 404 and expected write operations. The write operation comparison may comprise comparing a recorded write value of the write operations 404 to an expected range of write values (e.g., modeled range of write values). The evaluation module 410 may be configured to automatically determine the expected range of write values based on a known data type associated with the respective module 202. A model may be generated via a method known in the art, such as data tree structures, configured to automatically model a probability based on training data of inputs and outputs of a module 202 obtained over a range of values. In this regard, the output (write values) of a module 202 may be predicted based on a model.

For example, the operations 402, 404 may be separated (i.e., parsed) and counted. A count (e.g., 144 read operations paired with 144 write operations) and/or range of counts may be indicative of a proper test where all modules 202 behaved as expected. However, note that such a 'count' example is a nonlimiting illustration of merely one way to determine a performance 420 of the stateless software 204 and many other ways may be used in embodiments herein. By way of another example, in addition and/or in lieu of the above count example, a value (e.g., numerical value, textual string value, and/or the like) itself of the operations 402, 404 may be used to determine the performance 420.

Referring back to the 'count' example above, consider a scenario where twelve read operations and twelve write operations are expected to be executed based on each request sent to a main module 202 of a stateless software 204. In such a scenario, if twelve requests are sent, then— based on multiplying twelve by twelve—a count of 144 of each type of operation 402, 404 is determined to be expected. If such a count of 144 is actually measured by parsing the log 400 after a test of twelve requests, then the performance 420 may be indicative of a positive/successful test. Note that such an example is merely an example and may be more complex and nuanced, such as determining which module should trigger which other modules by an automated analysis of the dependencies in the code and determining which requests are configured to trigger which pathways of a module control coupling hierarchy. In this regard, which pathways are triggered based on which requests may be modeled and used to predict which modules 202 will be executed based on the requests.

Consider a scenario of adding a new module 202 to a stateless software 204. In such a scenario, the module 202 may be a child module 202*b* configured to be called by a parent module 202*a*. If a set of requests are known to be configured to execute the parent module 202*a* in past versions of the stateless software 204, then those requests could be used again with the newly added child module 202*b* to generate a new log 400 that differs from a previous log 400 generated without the child module 202*b*. For example, the new log 400 may have two additional read operations 402 and two additional write operations 404 associated with the new module 202*b* compared to the previous log 400. In this regard, in embodiments, a comparison of the new log 400 with the previous log 400 may be used to confirm a control coupling (e.g., module coupling 206) between the child module 202*b* and the parent module 202*a*, and thereby determine a performance 420 of the stateless software 204. This may be far more efficient than manually writing and evaluating a new test configured to confirm such a control coupling of the new module 202*b*.

The expected count(s) may be determined using any method. For example, as mentioned herein, a module control coupling hierarchy may be determined. For instance, the module control coupling hierarchy may be based on the control couplings 206. Furthermore, for each request, an expected count of number of executions of each module 202 may be predicted/estimated/generated as well as an expected operation count associated with each module 202. For instance, an expected operation count of read operations 402 and write operations 404 associated with each module 202 for each time such a module is executed/called may be determined and/or modeled for a set of values. For instance, such an expected operation count may be entered manually by a user and/or determined by passing one or more stateless module unit test requests 212 to the module 202. Such a process may be automated via the evaluation module 410. Next, an expected log 400 may be generated by using the expected operation counts for each module 202 and the expected count of number of executions of each module. This expected log may be compared to the actual log 400. A threshold (e.g., 2 or less operations 402, 404 with a difference from expected operations) may be used, wherein a similarity of such logs within the threshold is indicative of high performance 420.

At step 308, a performance 420 may be generated based on the determining of the performance of the stateless software 204. The performance 420 may include a metric value (e.g., key performance metric), a report of values, a graphical representation of values, and/or the like.

The one or more processors 136 of controller 132 may include any one or more processing elements known in the art. In this sense, the one or more processors 136 may include any microprocessor device configured to execute algorithms and/or instructions. In one embodiment, the one or more processors 136 may consist of a desktop computer, mainframe computer system, workstation, image computer, parallel processor, or other computer system (e.g., networked computer) configured to execute a program configured to operate the system 130, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium (e.g., memory 134). Moreover, different subsystems of the system 130 may include processor or logic elements suitable for carrying out at least a portion of the steps described throughout the present disclosure. Therefore, the above description should not be interpreted as a limitation on the present invention but merely an illustration.

The memory medium 134 may include any storage medium known in the art suitable for storing program instructions executable by the associated one or more processors 136. For example, the memory medium 134 may include a non-transitory memory medium. For instance, the memory medium 134 may include, but is not limited to, a read-only memory, a random access memory, a magnetic or optical memory device (e.g., disk), a magnetic tape, a solid state drive and the like. In another embodiment, it is noted herein that the memory 134 is configured to store one or more results from the system 130 and/or the output of the various steps described herein. It is further noted that memory 134 may be housed in a common controller housing with the one or more processors 136. In an alternative embodiment, the memory 134 may be located remotely with respect to the physical location of the processors and controller 132. For instance, the one or more processors 136 of controller 132 may access a remote memory (e.g., server), accessible through a network (e.g., internet, intranet and the like). In another embodiment, the memory medium 134 stores the program instructions for causing the one or more processors 136 to carry out the various steps described through the present disclosure.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

In another embodiment, the controller 132 of the system 130 may be configured to receive and/or acquire data or information from other systems by a transmission medium that may include wireline and/or wireless portions. In another embodiment, the controller 132 of the system 130 may be configured to transmit data or information (e.g., the output of one or more processes disclosed herein) to one or more systems or sub-systems by a transmission medium that may include wireline and/or wireless portions. In this manner, the transmission medium may serve as a data link between the controller 132 and other subsystems of the system 130. Moreover, the controller 132 may send data to external systems via a transmission medium (e.g., network connection).

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments," "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for evaluating stateless software, the system comprising:
   a controller, the controller comprising one or more processors configured to execute program instructions stored on a memory causing the one or more processors to:
   evaluate, via an evaluation module, a stateless software comprising modules, wherein the stateless software is configured to store data on a storage such that each request to the stateless software does not rely on a state of the stateless software from a previous request, wherein the evaluating of the stateless software comprises:
   executing the stateless software based on a set of requests;
   recording a log of read operations and write operations to the storage during the executing of the stateless software based on the set of the requests; and
   determining a performance of the stateless software based on a parsing and evaluation of the read operations and the write operations recorded on the log, wherein the determining of the performance comprises verifying a proper control coupling between the modules based on the read operations and the write operations, wherein the evaluation is based on at least one of a module control coupling hierarchy or data types associated with the modules, wherein the evaluation comprises determining the module control coupling hierarchy automatically based on an analysis of dependencies of the modules of the stateless software, wherein the verifying the proper control coupling is based on the module control coupling hierarchy, a count of the read operations, and a count of the write operations.

2. The system of claim 1, wherein the evaluation of the stateless software is configured to be performed automatically via the evaluation module.

3. The system of claim 1, wherein the determining of the performance of the stateless software comprises:
   verifying that a respective module is properly called by the stateless software based on a read operation comparison between the read operations and expected read operations.

4. The system of claim 1, wherein the determining of the performance of the stateless software comprises:
   verifying a functionality of a respective module based on a write operation comparison between the write operations and expected write operations.

5. The system of claim 4, wherein the write operation comparison comprises comparing:
   a recorded write value of the write operations to an expected range of write values.

6. The system of claim 5, wherein the evaluation module is configured to automatically determine the expected range of write values based on a known data type associated with the respective module.

7. The system of claim 1, wherein the set of the requests is configured to generate a same message a discrete number of expected times, wherein the determining of the performance of the stateless software comprises comparing a recorded number of times the message is generated compared to the discrete number of expected times.

8. A method for evaluating stateless software, the method comprising:
   evaluating, via an evaluation module, a stateless software comprising modules, wherein the stateless software is configured to store data on a storage such that each request to the stateless software does not rely on a state of the stateless software from a previous request, wherein the evaluating of the stateless software comprises:

executing the stateless software based on a set of requests;

recording a log of read operations and write operations to the storage during the executing of the stateless software based on the set of the requests; and determining a performance of the stateless software based on a parsing and evaluation of the read operations and the write operations recorded on the log, wherein the determining of the performance comprises verifying a proper control coupling between the modules based on the read operations and the write operations, wherein the evaluation is based on at least one of a module control coupling hierarchy or data types associated with the modules, wherein the evaluation comprises determining the module control coupling hierarchy automatically based on an analysis of dependencies of the modules of the stateless software, wherein the determining of the performance comprises verifying the proper control coupling between the modules, based on the module control coupling hierarchy, a count of the read operations, and a count of the write operations.

9. The method of claim 8, wherein the evaluation of the stateless software is configured to be performed automatically via the evaluation module.

10. The method of claim 8, wherein the determining of the performance of the stateless software comprises verifying that a respective module is properly called by the stateless software based on a read operation comparison between the read operations and expected read operations.

11. The method of claim 8, wherein the determining of the performance of the stateless software comprises verifying a functionality of a respective module based on a write operation comparison between the write operations and expected write operations.

12. The method of claim 11, wherein the write operation comparison comprises comparing a recorded write value of the write operations to an expected range of write values.

13. The method of claim 12, wherein the evaluation module is configured to automatically determine the expected range of write values based on a known data type associated with the respective module.

14. The method of claim 8, wherein the set of the requests is configured to generate a same message a discrete number of expected times, wherein the determining of the performance of the stateless software comprises comparing a recorded number of times the message is generated compared to the discrete number of expected times.

* * * * *